United States Patent
Crowley et al.

(10) Patent No.: US 11,620,364 B2
(45) Date of Patent: Apr. 4, 2023

(54) LAYERED-INFRASTRUCTURE BLOCKCHAIN-BASED SYSTEM FOR SOFTWARE LICENSE DISTRIBUTION

(71) Applicant: EMC IP HOLDING COMPANY LLC, Hopkinton, MA (US)

(72) Inventors: Owen Crowley, Carrigaline (IE); Peniel Charles, Bangalore (IN); Joseph Kanjirathinkal, Cary, NC (US)

(73) Assignee: Dell Products, L.P., Hopkinton, MA (US)

( * ) Notice: Subject to any disclaimer, the term of this patent is extended or adjusted under 35 U.S.C. 154(b) by 123 days.

(21) Appl. No.: 17/409,167

(22) Filed: Aug. 23, 2021

(65) Prior Publication Data
US 2023/0054904 A1   Feb. 23, 2023

(51) Int. Cl.
*G06F 21/10* (2013.01)
(52) U.S. Cl.
CPC .... *G06F 21/105* (2013.01); *G06F 2221/0753* (2013.01)
(58) Field of Classification Search
CPC .......... H04L 9/50; G06F 21/105; G06F 21/10
See application file for complete search history.

(56) References Cited

U.S. PATENT DOCUMENTS

| | | | | |
|---|---|---|---|---|
| 2017/0005804 | A1* | 1/2017 | Zinder | H04L 63/123 |
| 2017/0116693 | A1* | 4/2017 | Rae | G06Q 50/184 |
| 2018/0096347 | A1* | 4/2018 | Goeringer | H04L 9/3247 |
| 2019/0058910 | A1* | 2/2019 | Solow | H04N 21/4405 |
| 2019/0104196 | A1* | 4/2019 | Li | G06F 16/2379 |
| 2019/0155997 | A1* | 5/2019 | Vos | G06F 21/105 |
| 2019/0180311 | A1* | 6/2019 | Chan | G06Q 30/0239 |
| 2019/0180519 | A1* | 6/2019 | Hausman | G07B 15/063 |
| 2019/0213633 | A1* | 7/2019 | Kokernak | G06Q 20/3829 |
| 2019/0220854 | A1* | 7/2019 | Pesci | H04L 9/50 |
| 2020/0014527 | A1* | 1/2020 | Subramaniam | H04L 63/00 |
| 2020/0184556 | A1* | 6/2020 | Celia | G06V 10/762 |
| 2021/0064723 | A1* | 3/2021 | Drake | H04L 9/3247 |

* cited by examiner

*Primary Examiner* — Dao Q Ho
(74) *Attorney, Agent, or Firm* — Anderson Gorecki LLP

(57) ABSTRACT

A layered-infrastructure blockchain-based system for software license distribution includes a distributed cloud of blockchain full nodes. Each blockchain full node contains a blockchain data structure on which a complete set of license key transactions are recorded. The layered-infrastructure also includes a plurality of storage systems. Each respective storage system contains a blockchain light data structure on which only a subset of license key transactions associated with that respective storage system are recorded. A plurality of hosts connect to the plurality of storage systems. As the hosts connect to the storage systems, license key transactions are generated, such that the license key transactions that are recorded in the blockchain-based system for software license distribution are associated with the connection events between the plurality of hosts and the plurality of storage systems.

11 Claims, 8 Drawing Sheets

LAYERED-INFRASTRUCTURE BLOCKCHAIN-BASED SYSTEM FOR SOFTWARE LICENSE DISTRIBUTION

FIELD

This disclosure relates to computing systems and related devices and methods, and, more particularly, to a layered-infrastructure blockchain-based system for software license distribution.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
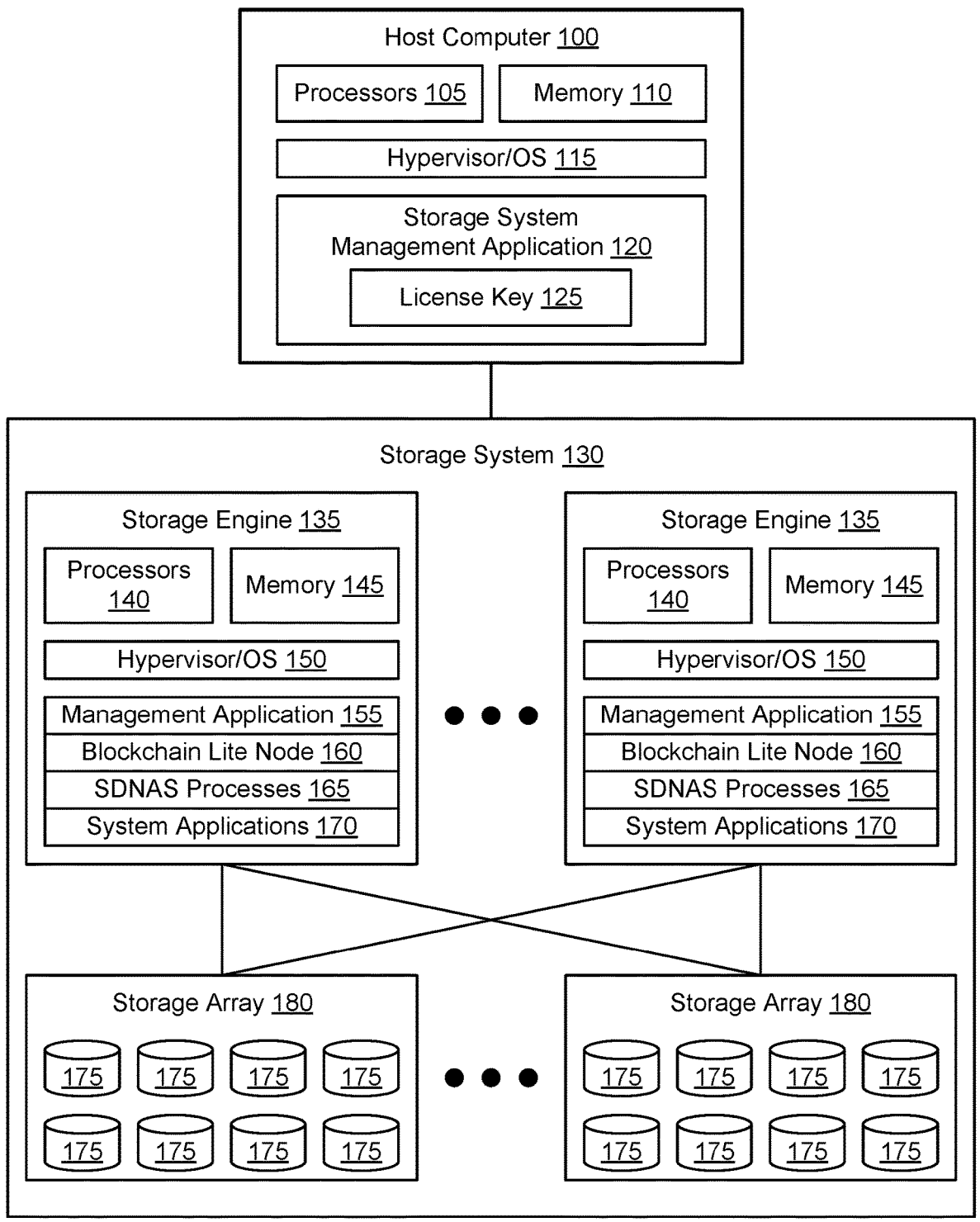
FIG. 1 is a functional block diagram of an example storage system connected to a host computer, according to some embodiments.

FIG. 1 illustrates a storage system 130 connected to a host computer 100, of which there may be many. In the illustrated example the host computer 100 is a server with memory 110, one or more tangible processors 105, and a hypervisor or OS (Operating System) 115. The processors 105 may include one or more multi-core processors that include multiple CPUs (Central Processing Units), GPUs (Graphical Processing Units), and combinations thereof. The memory 110 may include RAM (Random Access Memory) of any type or persistent storage implemented, for example, using one or more SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 100 might support multiple virtual hosts running on virtual machines or containers, and although an external host computer 100 is illustrated, in some embodiments host computer 100 may be implemented as a virtual machine within storage system 130.

The storage system 130 provides data storage services for applications running on host computer 100. As described in greater detail herein, in some embodiments one of the applications executing in the context of the hypervisor/operating system 115 on host computer 100 is a storage system management application 120 that is configured to enable the host computer 100 to access storage resources provided by storage system 130, and to enable the host computer 100 to configure aspects of how the storage system 130 operates in connection with providing storage resources.

The storage system 130 includes a plurality of compute nodes referred to herein as storage engines 135 for providing data storage services. A given storage system 130 may have multiple storage engines 135. In some embodiments, storage engines 135 may be implemented using separate physical enclosures within the storage system 130. A given storage system 100 may include one or multiple storage engines 135.

The storage system 130 maintains data for host applications running on the host computer 100. For example, a host application may write host application data to the storage system 130 and read host application data from the storage system 130 in order to perform various functions. Examples of host applications may include, but are not limited to, file servers, email servers, block servers, databases, and storage system management applications 120. Host data is stored in managed resources 175 of storage arrays 180 under the direction of storage engines 135.

Each storage engine 135 includes processors 140, memory 145, and other physical resources to enable the storage engine 135 to provide storage services to host computer 100. A hypervisor 150 abstracts the physical resources of the storage system 130 from one or more virtual machines (not shown) instantiated on the storage engine 135, and allocates physical resources of storage engine 135 for use by the virtual machines.

As shown in FIG. 1, the virtual machines may execute multiple applications to enable the storage engine 135 to provide storage services to host computer 100. One example application is a storage system management application 155. The storage system management application 155 interacts with storage system management application 120 on host computer 100 to enable the host to configure operation of storage engines 135 of the storage system 130. Example operations that may be implemented using the storage system management application 155 may be to cause one or more software defined network attached storage processes 165 to be created on the storage engine 135. The storage engine 135, in some embodiments, includes multiple system applications 170 that can be used to provide particular storage features, such as to cause data stored on managed storage resources 175 of attached storage array 180 to be mirrored to another storage system 130 or otherwise protected against loss.

As known to a person of ordinary skill in the art, storage systems 130 are incredibly complicated systems. When a host computer 100 connects to the storage system 130, the storage system 130 will provide the storage system 130 with a copy of a license key 125, which can be used by the storage system 130 to verify whether the storage system management application 120 is authorized to connect to the storage system 130. Unfortunately, management of license keys conventionally has several drawbacks.

For example, in some license key management systems, as long as the license key is valid, there is no limit on how many hosts can use the same license key 125. Accordingly, under this scheme, if a customer purchases a static license key to access the storage system 130, the customer could use the same license key with multiple hosts, since are no restrictions as to how many hosts can use the single license key, which can lead to abuse of this licensing method.

In other licensing key management systems, the storage system 130 may be configured to enable a particular number of hosts to simultaneously connect to the storage system 130. For example, a given customer can be instructed that they are allowed to connect a maximum of 75 hosts, for example, to a given storage system. However, if the storage system 130 is not configured to prevent the customer from connecting more than 75 hosts, it can be difficult in practice to police and enforce these types of limitations.

Customers not only expect high quality services from the storage system 130, they also expect to be able to use the full extent of the purchased product seamlessly. Thus, if a customer purchases a license to use particular features, and decides that they would like to also access additional features that are require access to an additional license, the customer would like to simply access the new features without having to first go through the process of obtaining an additional license key to activate those product features.

According to some embodiments, a layered-infrastructure blockchain-based system for software license distribution is used for license key management. In some embodiments, the layered-infrastructure combines the centralized power of a cloud solution with the distributed decentralized structure of a fog solution, and integrates the result with blockchain technology, to ensure that customers can immediately access the fully licensed features of a software product running at the edge of a network, while at the same time securely enforcing the licensing requirements of the product. In some embodiments, this design enables a global license tracking and distribution utility, where licenses can be shared across sites, across countries, and across continents.

Figure 2:
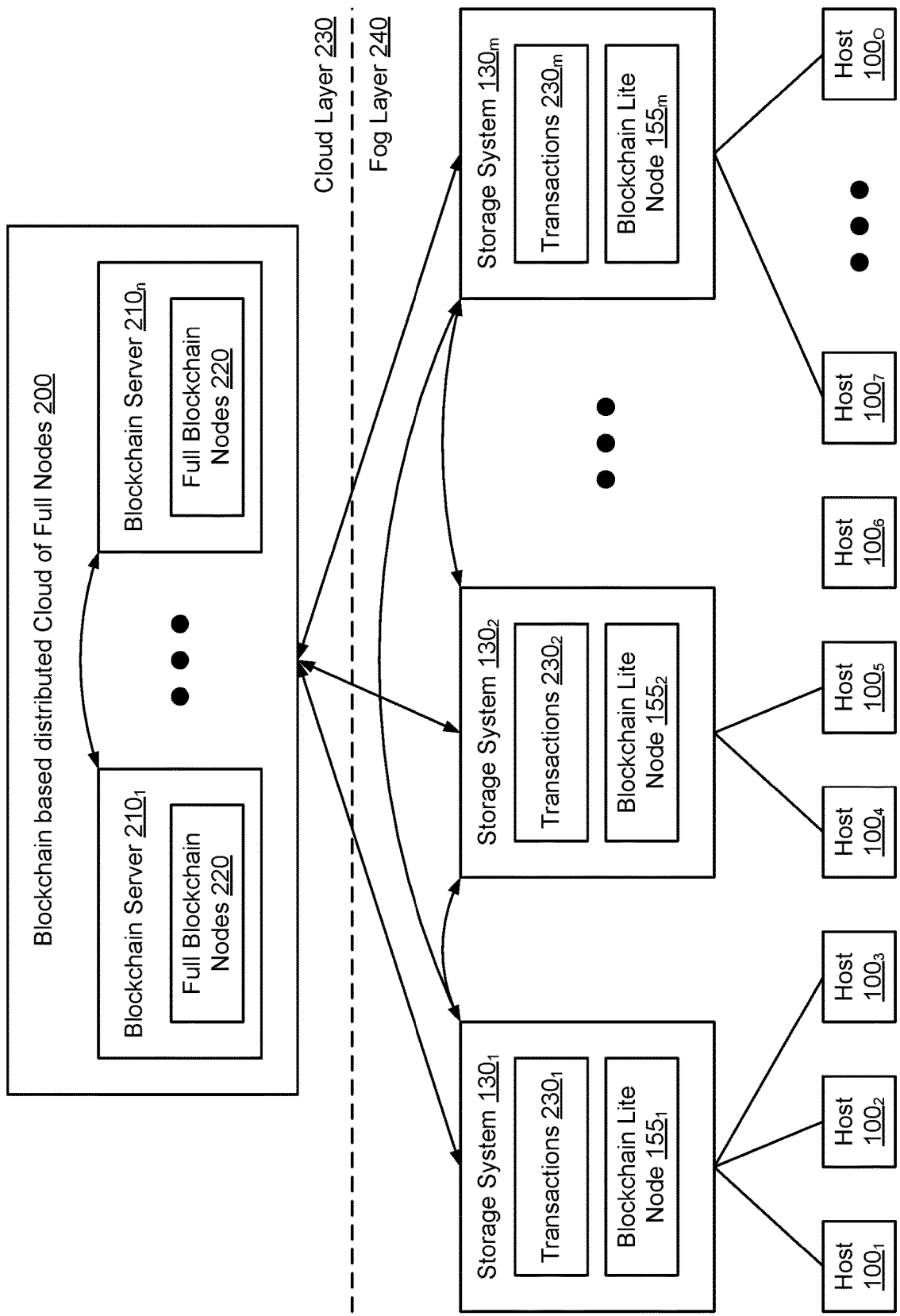
FIG. 2 is a functional block diagram of an example layered-infrastructure blockchain-based system for software license distribution, according to some embodiments.

FIG. 2 is a functional block diagram of an example layered-infrastructure blockchain-based system for software license distribution, according to some embodiments. As shown in FIG. 2, in some embodiments the layered infrastructure includes a cloud layer 230, which includes a blockchain based distributed cloud of blockchain full nodes 200. In some embodiments, the cloud of blockchain full nodes 200 is implemented using blockchain servers $210_1$-$210_n$, each of which includes a full copy of the blockchain nodes 220. An example blockchain data structure is described in greater detail below in connection with FIG. 7.

Additionally, as shown in FIG. 2, in some embodiments the layered infrastructure includes a fog layer 240, in which each storage system $130_1$, $130_2$, $130_m$ maintains a blockchain light node containing blocks of transactions relevant only to that storage system. As hosts $100_1$-$100_o$ register with the storage systems $130_1$-$130_m$, locally connected storage systems 130 locally reconcile host registration data with each other and then send host registration ledgers to the cloud of blockchain full nodes for validation. The cloud of full nodes run the required validation checks and, having passed validation, add the transactions to the blockchain full nodes 220. Updates are then created and sent back to the storage systems 130, to enable the storage systems to update the blockchain light nodes $160_1$-$160_m$.

There are several benefits of using blockchain based solution over a simple dial-home solution. For example, from a security perspective, in a private blockchain only nodes that are invited into the blockchain can access the data. The structure of the blockchain also makes the transactions secure, since the transactions that make up the blockchain are distributed across all nodes in the blockchain. Since a transaction cannot be modified after being written to the blockchain without being detected, the licensing process is unable to be manipulated after the data has been entered into the blockchain. Since all license transactions associated with a particular license key are recorded in the blockchain, any license usage can be traced throughout its lifetime. Since the blockchain full nodes are implemented at the cloud layer, it is possible to scale the blockchain full nodes to include as many full nodes as are required to handle the volume of data received from the storage arrays. By using a blockchain light node at the storage system 130 level, the impact to the processing power of the storage system is minimized as the majority of validation checks have already been performed in the cloud of blockchain full nodes, and the only transaction validation required of the storage system/blockchain light node, is to validate that the update received from the cloud of full blockchain nodes 200 is applicable to the individual storage system 130.

FIGS. 3-6 are swim-lane diagrams of several example interactions between participants of a layered-infrastructure blockchain-based system for software license distribution. In FIGS. 3-6, license key values are identified using the letter H. Thus, H1 would be license key #1, H2 would be license key #2, etc. Transactions are identified using the letter T. Thus, T1 would be transaction #1, T2 would be transaction #2, etc.

Figure 3:
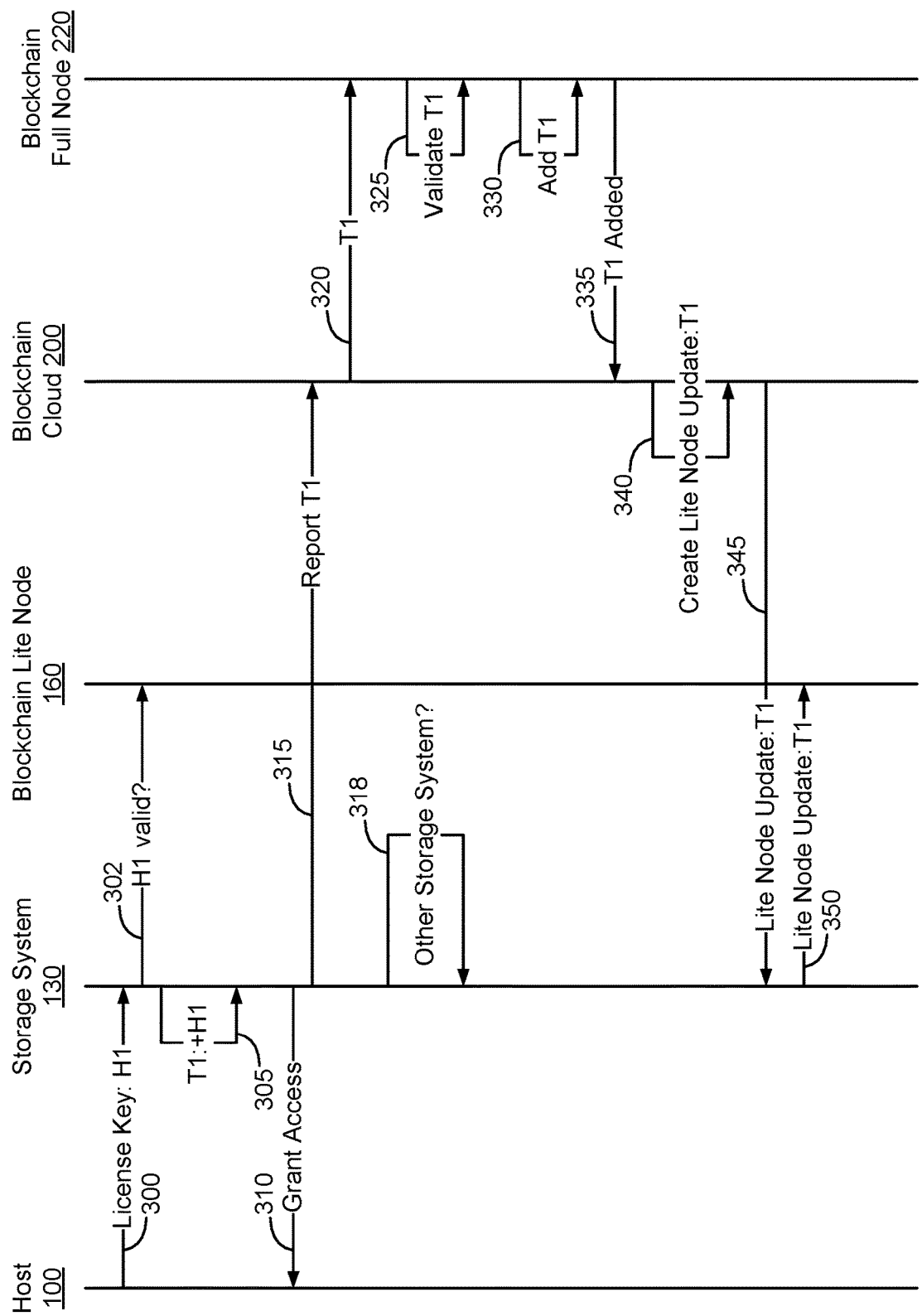
FIG. 3 is a swim-lane diagram of an example interaction between participants of a layered-infrastructure blockchain-based system for software license distribution, in connection with registration of a valid software license key by a host on a storage system, according to some embodiments.

FIG. 3 is a swim-lane diagram of an example interaction between participants of a layered-infrastructure blockchain-based system for software license distribution, in connection with registration of a valid software license key by a host on a storage system, according to some embodiments.

As shown in FIG. 3, when a host 100 connects to a storage system 130, the host 100 will transmit its license key 125 (arrow 300). In this instance, the host is shown as having license key H1. Optionally, as shown in FIG. 3, the host may check the submitted license key H1 against transactions stored in the storage system's blockchain light node (arrow 302). The storage system 130 will generate a transaction T1 (305) to indicate that license key H1 was used by host 100 to obtain access to storage system 130. The storage system 130 also grants access to host 100 (arrow 310). Transaction T1 is not written to the blockchain light node 160 on storage system 130 at this point. Storage system 130 may also communicate with peer storage systems 130 (arrow 318) to determine if host 100 previously registered the license key H1 with another storage systems 130 (see FIG. 5).

Periodically, for example once per day, each storage system 130 will report all license key transactions to the blockchain cloud 200 (arrow 315). The transactions are distributed to each of the blockchain full nodes (arrow 320) where the transactions are processed against other license key transactions that were previously registered on the blockchain full nodes 220 (arrow 325). For example, when a customer purchases a license, the purchased license key may be recorded in the blockchain full node. As another example, if a customer purchases 100 licenses, as the customer uses the licenses, each of the used license keys will be recorded for that customer in the blockchain full node. Thus, the blockchain full node has a record of how many of the 100 purchased licenses have been used, and can determine whether the customer has any remaining purchased licenses that the host can use to access storage system 130.

The blockchain full nodes 220 thus validate transaction T1 (arrow 325). In FIG. 3 it is assumed that the transaction T1 is valid, and so transaction T1 is added to the blockchain data structure in each of the blockchain full nodes 220 (arrow 330). Once the transaction T1 has been recorded on the blockchain data structure (arrow 335) a blockchain light node update is created for the storage system 130 (arrow 340). The light node update creation process is shown as occurring on the blockchain cloud 200, but in some embodiments the light node update creation process is performed by one of the blockchain servers 210.

The blockchain light node update is passed to storage system 130 (arrow 345) and added by the storage system 130 to the blockchain light node 160 maintained by the storage system 130 (arrow 350). In some embodiments the storage system 130 checks metadata associated with the light node update to ensure that the light node update is intended for storage system 130 before adding the transactions identified in the light node update to its blockchain light node 160.

Figure 4:
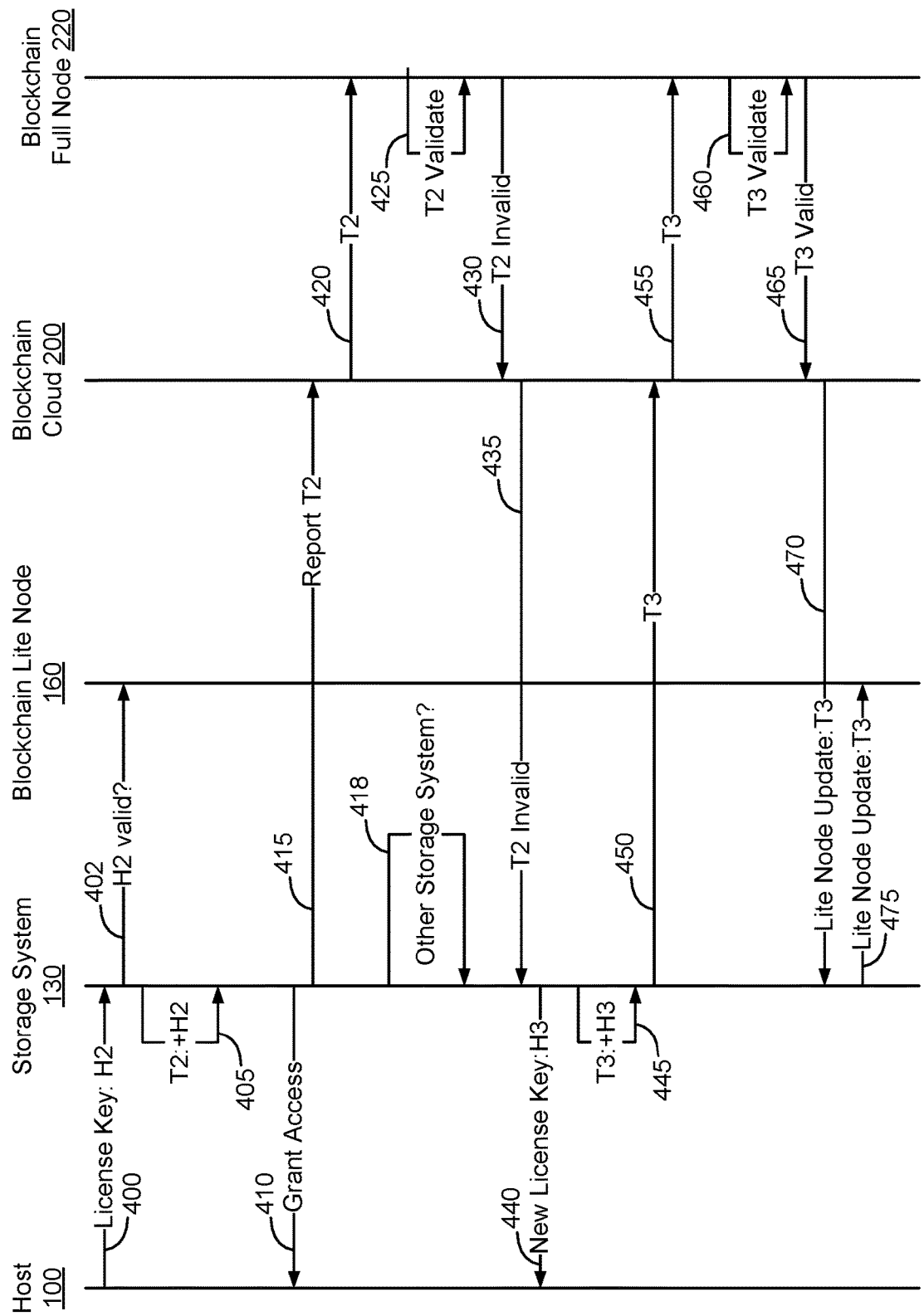
FIG. 4 is a swim-lane diagram of an example interaction between participants of a layered-infrastructure blockchain-based system for software license distribution, in connection with registration of an invalid software license key by a host on a storage system, according to some embodiments.

FIG. 4 is a swim-lane diagram of an example interaction between participants of a layered-infrastructure blockchain-based system for software license distribution, in connection with registration of an invalid software license key by a host on a storage system, according to some embodiments.

As shown in FIG. 4, when a host 100 connects to a storage system 130, the host 100 will transmit its license key 125 (arrow 400). In this instance, the host is shown as having license key H2 which, in this example, is an invalid license key. The license key could have expired, or be invalid for any number of reasons. The storage system 130, however, is not aware that license key H2 is not a valid license key at this point.

Optionally, as shown in FIG. 4, the host may check the submitted license key H2 against transactions stored in the storage system's blockchain light node (arrow 402). If the blockchain light node 160 identifies the license key H2 as invalid, the process may skip to arrow 440 where the storage system 130 assigns a new license key H3 to the host 100. If the blockchain light node 160 does not identify the license key as invalid, the process will continue with the storage system 130 providing access to the host 100 under the assumption that the license key H2 is valid.

In the example shown in FIG. 4, it will be assumed that the storage system's blockchain light node 160 does not contain an indication that the license key H2 is invalid. Accordingly, the storage system 130 will generate a transaction T2 (405) to indicate that license key H2 was used by host 100 to obtain access to storage system 130. The storage system 130 also grants access to host 100 (arrow 410). Transaction T2 is not written to the blockchain light node 160 on storage system 130 at this point. Storage system 130 may also communicate with peer storage systems 130 (arrow 418) to determine if host 100 previously registered the license key H2 with another storage systems 130 (see FIG. 5).

Periodically, for example once per day, each storage system 130 will report all license key transactions to the blockchain cloud 200 (arrow 415). The transactions are distributed to each of the blockchain full nodes 220 (arrow 420) where the transactions are processed against other license key transactions that were previously registered on the blockchain full nodes 220 (arrow 425). As shown in FIG. 4, in this instance the license key H2 is determined to be invalid when processed against other license key transactions that have been registered on the blockchain full nodes (arrow 430). Example reasons that a license key may be found to be invalid might include a determination that the license key is already in use by another host, a determination that the license key has expired, a determination that the license key was purchased by another entity not associated with the host, or numerous other reasons.

Once the license key has been determined to be not valid, the blockchain cloud 200 will report to the storage system that the license key H2 is invalid (arrow 435). In some embodiments, to facilitate continued access by host 100, the storage system 130 will select a new license key H3 and assign the new license key to the host (arrow 440). The new license key H3 may be obtained by the storage system from the blockchain cloud 200, from a pool of license keys, or in another manner depending on the implementation.

In some embodiments, when the storage system 130 assigns a new license key H3 to the host 100, the storage system generates a transaction T3 indicating that a the new license key H3 has been assigned to host 100 (arrow 445). This transaction T3 is subsequently submitted to the blockchain cloud 200 (arrow 450) and is processed against the blockchain full nodes 220 (arrow 455 & 460). If the new license key H3 is determined to be valid (arrow 465) the blockchain cloud will generate a light node update for storage system 130 (arrow 470), which enables the storage system 130 to record the license transaction T3 in its blockchain light node 160 (arrow 475).

Figure 5:
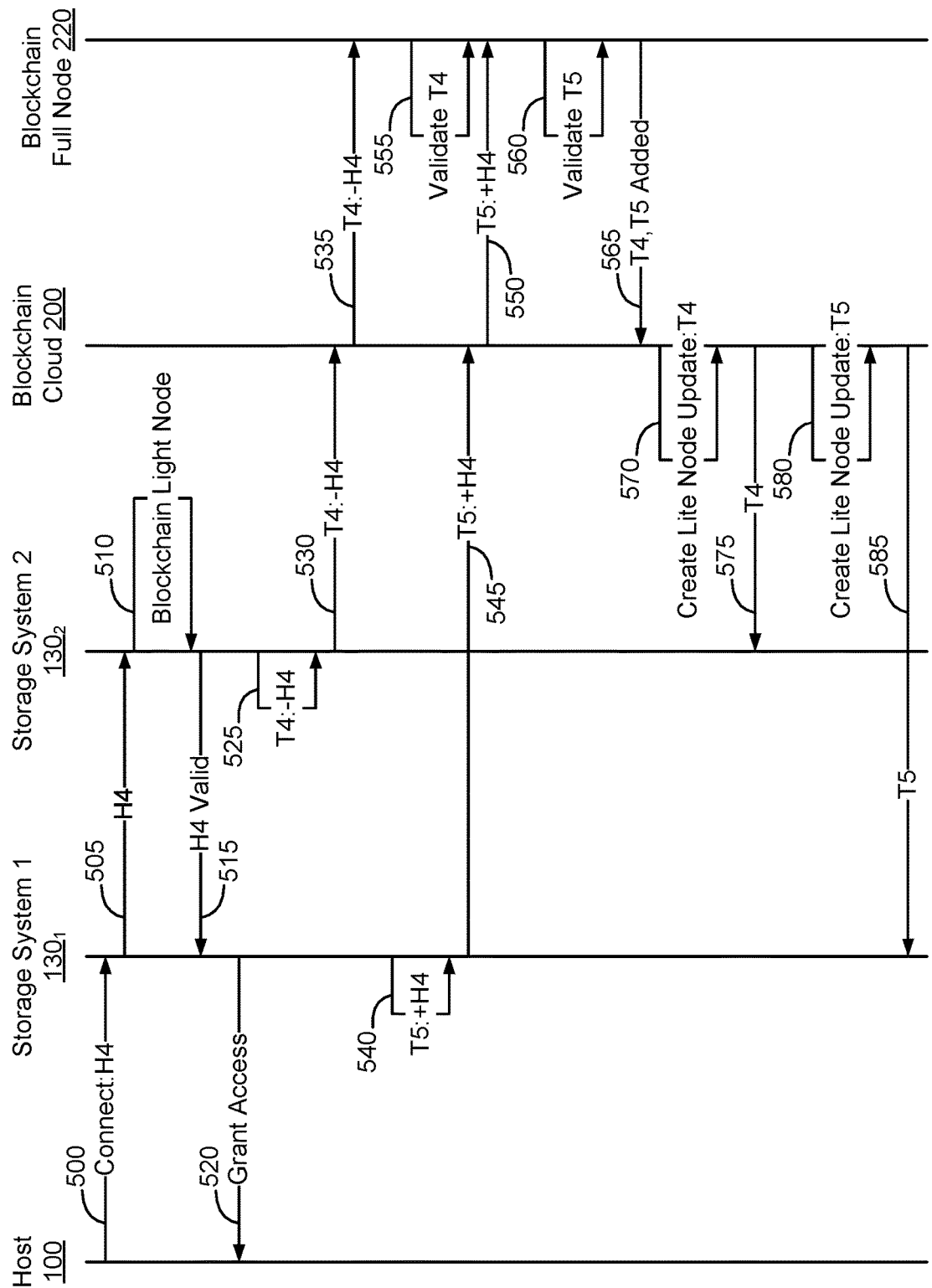
FIG. 5 is a swim-lane diagram of an example interaction between participants of a layered-infrastructure blockchain-based system for software license distribution, in connection with movement of a host from a first storage system to a second storage system, according to some embodiments.

FIG. 5 is a swim-lane diagram of an example interaction between participants of a layered-infrastructure blockchain-based system for software license distribution, in connection with movement of a host from a second storage system $130_2$ to a first storage system $130_1$, according to some embodiments. As shown in FIG. 5, in some embodiments, when a host connects to a storage system $130_1$ using a license key H4 (arrow 500), the storage system $130_1$ will check with other connected storage systems $130_2$ (arrow 505) to determine if any other connected storage system is able to validate the license key H4 on transactions included in their blockchain light node (arrow 510). While a single other connected storage system $130_2$ is shown in FIG. 5, it should be understood that the storage system $130_1$ may be connected to multiple other local or remote storage systems.

Storage systems may be connected using various technologies. For example, storage systems may be arranged in mirroring pairs for data backup using a technology such as remote data forwarding. Other connections similarly may exist between storage systems. Accordingly, different technologies may be used to enable storage systems to transmit transactions between each other to enable the transactions to be evaluated by the storage systems using the blockchain light nodes 160.

In the example shown in FIG. 5, when storage system 2 receives the license key H4 from storage system 1, storage system 2 will process the license key H4 against its blockchain light node 160 (arrow 510) to determine if license key H4 is valid. Since each blockchain light node 160 only contains information about license keys 125 that have been used by hosts 100 to connect to that particular storage system 130, if a storage system's blockchain light node contains information about the license key, that means that the license key has previously been used by a host 100 to obtain access to that storage system 130. This may occur, for example, if a host 100 previously connected to storage system $130_2$ and now is connecting to storage system $130_1$.

In the example shown in FIG. 5, it is assumed that storage system $130_2$ determines, from its blockchain light node 160 (arrow 510), that license key H4 is valid. Accordingly, storage system 2 will respond to storage system $130_1$ with an indication that license key H4 is known (arrow 515).

When host 100 connects to storage system $130_1$, the host 100 will automatically grant access to the host (arrow 520). Although FIG. 5 shows access being granted to host 100 after the storage system $130_1$ determines from storage system $130_2$ that license key H4 is valid, in some embodiments access may be granted to host 100 (arrow 520) before the peer-to-peer storage system license key validation process is complete. Thus, for example, arrow 520 could occur directly after arrow 500 and before arrow 505, or at any point in this process.

As shown in FIG. 5, when storage system $130_2$ determines from its blockchain light node 160 that license key H4 was previously registered on storage system $130_2$, but now has been registered on storage system $130_1$, storage system $130_2$ will generate a transaction T4 to indicate that storage key H4 is no longer registered on storage system $130_2$ (arrow 525). At some point storage system $130_2$ will transmit transaction T4 to the blockchain cloud (arrow 530) where the transaction will be transmitted to the blockchain full nodes 220 (arrow 535) for processing (arrow 555).

Similarly, storage system $130_1$ will generate a transaction T5 to indicate that storage key H4 has been registered on storage system $130_1$ (arrow 540). At some point storage system $130_1$ will transmit transaction T5 to the blockchain cloud (arrow 545) where the transaction will be transmitted to the blockchain full nodes 220 (arrow 550) for processing (arrow 560).

The blockchain full nodes 220 will process transaction T4 (arrow 555) and transaction T5 (arrow 560) and add those transactions to the blockchain full nodes (arrow 565). The blockchain cloud 200 will then create a blockchain light node update for storage system $130_2$ (arrow 570) and transmits the blockchain light update to storage system $130_2$ (arrow 575). When storage system $130_2$ receives the blockchain light update from the blockchain cloud 200, the storage system $130_2$ will validate the metadata associated with the blockchain light update to ensure the blockchain light update is intended for storage system $130_2$. If the blockchain light update is validated, the transaction T4 will be added to the blockchain light node on storage system $130_2$, to indicate that license key H4 is no longer being used by a host on storage system $130_2$.

The blockchain cloud 200 will also create a blockchain light node update for storage system $130_1$ (arrow 580) and transmits the blockchain light update to storage system $130_1$ (arrow 585). When storage system $130_1$ receives the blockchain light update from the blockchain cloud 200, the storage system $130_1$ will validate the metadata associated with the blockchain light update to ensure the blockchain light update is intended for storage system $130_1$. If the blockchain light update is validated, the transaction T5 will be added to the blockchain light node 160 on storage system $130_1$, to indicate that license key H4 is now being used by a host 100 on storage system $130_1$.

Figure 6:
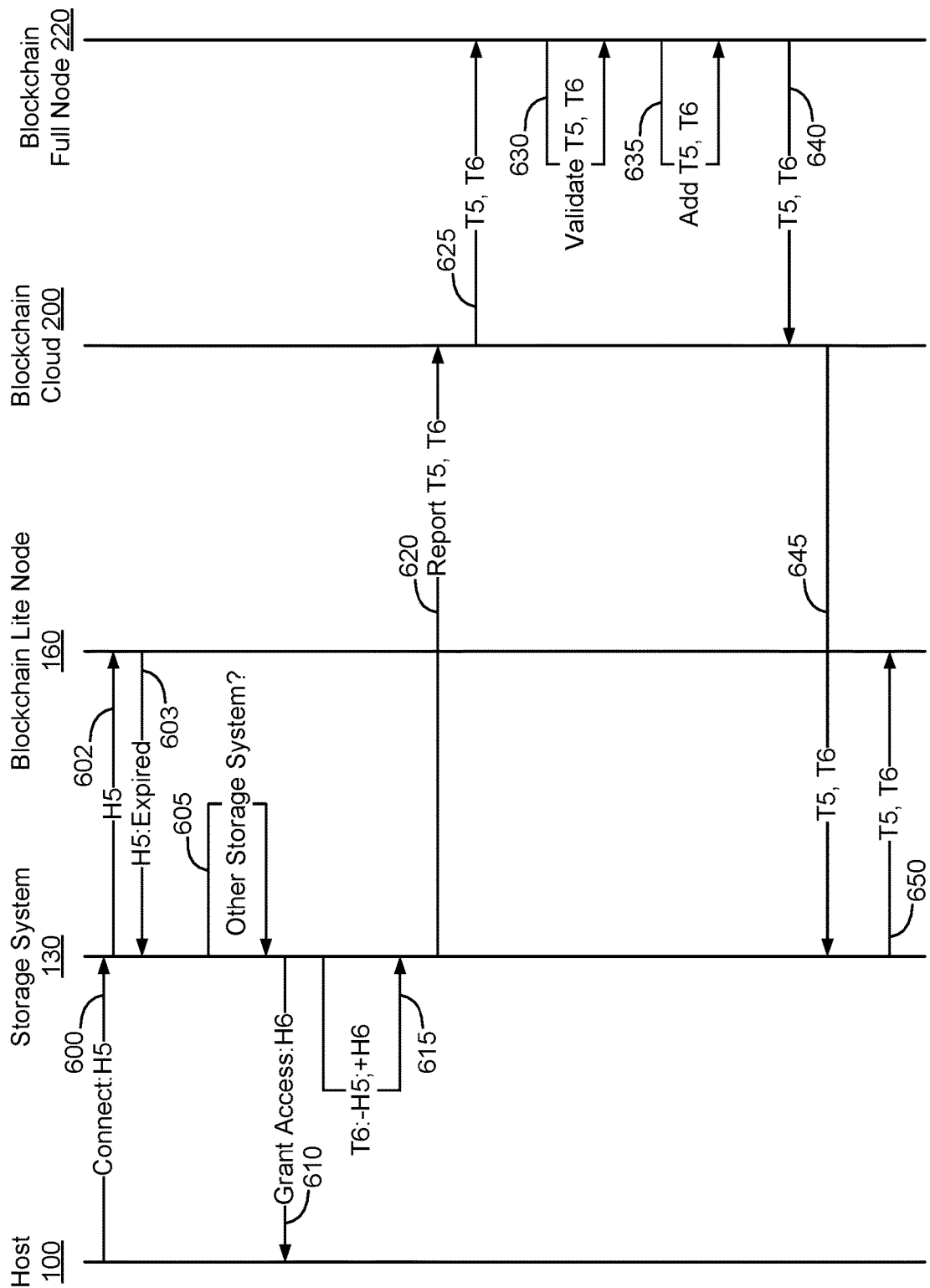
FIG. 6 is a swim-lane diagram of an example interaction between participants of a layered-infrastructure blockchain-based system for software license distribution, in connection with expiration of a license key, according to some embodiments.

FIG. 6 is a swim-lane diagram of an example interaction between participants of a layered-infrastructure blockchain-based system for software license distribution, in connection with expiration of a license key, according to some embodiments. As shown in FIG. 6 in this example connection scenario the host 100 connects to a storage system 130 using license key H5 (arrow 600). The storage system 130 then determines that license key H5 has expired. Storage system 130 may determine that license key H5 has expired by checking license key H5 against its own blockchain light node 160 (arrows 602, 603). Alternatively, storage system 130 may determine that license key H5 has expired by communicating license key H5 to one or more peer storage systems 130 (arrow 605) and learning from the peer storage system that that peer storage system's blockchain light node 160 indicates that the license key H5 has expired. Likewise, the storage system 130 may determine that license key H5 has expired by communicating license key H5 to the blockchain cloud 200 (see FIG. 4) and learning from the blockchain cloud that the license key H5 has expired. A license key may expire, for example, where a license key was previously registered on a first storage system and then the host moves to another storage system and starts using the same license key on the second storage system (See FIG. 5).

Regardless of how the storage system 130 determines that license key H5 has expired, in some embodiments the storage system automatically grants access to the host using a new license key H6 (arrow 610). The storage system then generates transaction T6 indicating that license key H5 is no longer being used by the host 100 on storage system 130, and that new license key H6 has been assigned to host 100 for use on storage system 130.

At some point the transactions T5, T6 are reported to the blockchain cloud 200 (arrow 620) and are forwarded to the blockchain full nodes 220 for processing (arrow 625). The blockchain full nodes will validate transactions T5, T6 (arrow 630) and, assuming transactions T5, T6 are valid, will add transactions T5 and T6 to the blockchain (arrow 635). The blockchain full nodes 220 will notify the blockchain cloud 200 that transactions T5 and T6 have been added to the blockchain (arrow 640) and the blockchain cloud will generate and transmit a blockchain light node update for storage system 130 (arrow 645). When the blockchain light node update is received by storage system 130, the storage system 130 will validate it and add the transactions to its blockchain light node 160 (arrow 650).

Figure 7:
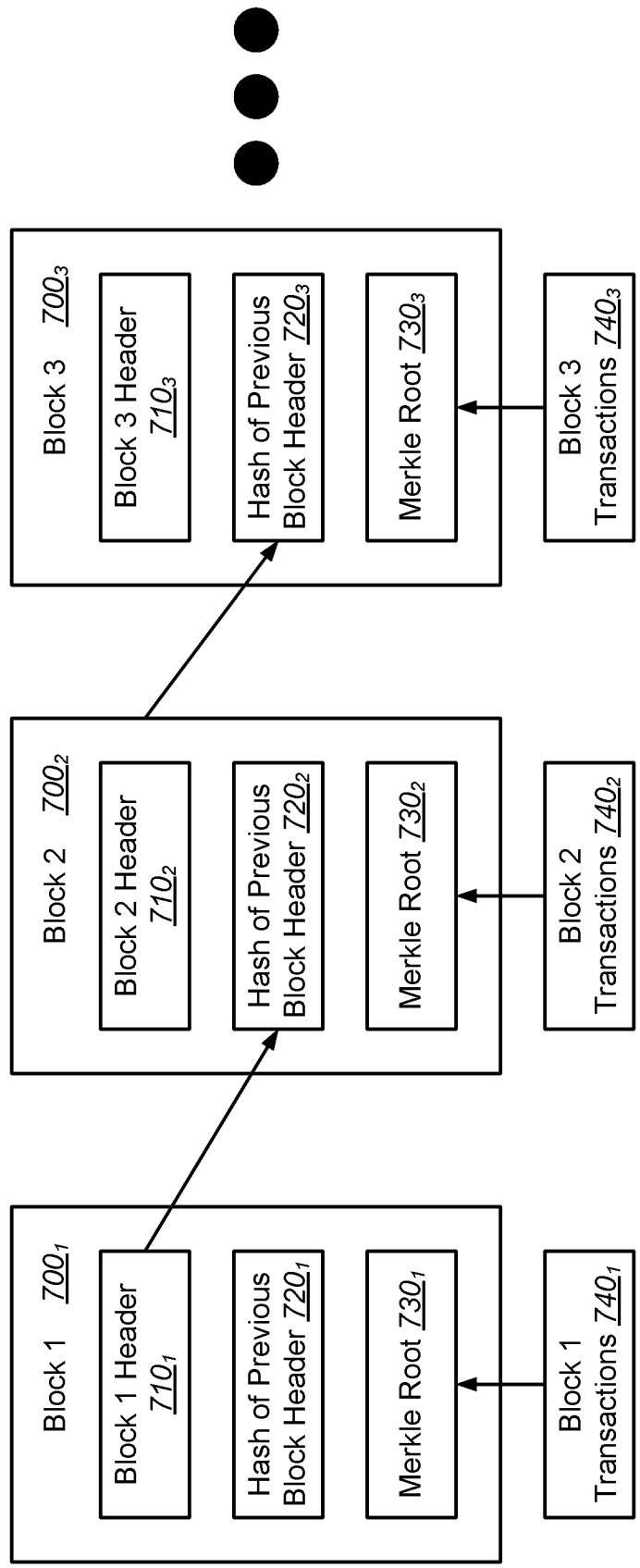
FIG. 7 is a functional block diagram of an example blockchain data structure, according to some embodiments.

FIG. 7 is a functional block diagram of an example blockchain data structure, according to some embodiments. As shown in FIG. 7, at a high level a blockchain data structure can be thought of as a series of interconnected blocks $700_1$, $700_2$, $700_3$, etc. Each block has a header 710, a hash of a previous block header 720, and a Merkle root 730. Transactions 740 associated with the block are used to create a Merkle tree based at the Merkle root. A Merkle tree, in this context, is a tree data structure in which each leaf node is labeled with the cryptographic hash of a data block, and each non-leaf node is labeled with the cryptographic hash of the labels of its child nodes. In the context of layered-infrastructure blockchain-based system for software license distribution 100 described herein, the block transactions $740_1$-$740_n$ are descriptions of the license key transactions, such as a purchase of a license key, use of the license key, movement of a license key from a first storage system to a second storage system, expiration of a license key, or other events that may be associated with a particular software license key or set of software license keys. By storing the license key transactions in blocks 700 of a distributed ledger implemented using a blockchain data structure, such as the blockchain data structure shown in FIG. 7, it is possible to ensure that the records of the license key transactions are not modified once they are stored in the blockchain. Specifically, the blockchain data structure is configured such that it is not possible to alter an earlier block of the blockchain in an undetectable manner, which ensures that the earlier recorded license key transactions cannot be changed after being recorded in the blockchain data structure. Although FIG. 7 shows a particular blockchain data structure, other forms of blockchain data structures or other forms of distributed ledgers may be used depending on the particular implementation.

Figure 8:
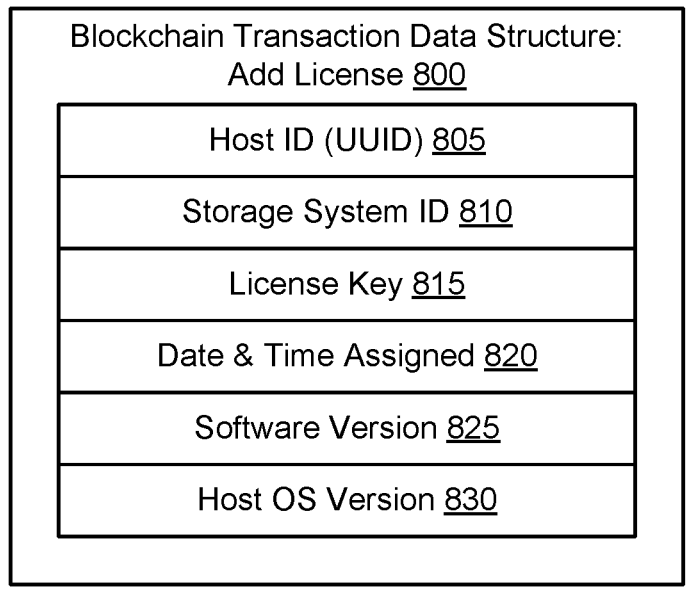
FIG. 8 is a functional block diagram of an example blockchain transaction data structure associated with allocating a software license key to a host, according to some embodiments.

FIG. 8 is a functional block diagram of an example blockchain transaction data structure having a plurality of data fields 805-830 configured to enable description of a transaction associated with allocating a software license key to a host, according to some embodiments. Data fields 805-830 enable a complete understanding of the add license transaction 800 to be registered on the blockchain full nodes 220.

In the illustrated example, the add license transaction includes a host identifier data field 805 which, in some embodiments, is used to identify a Universally Unique Identifier (UUID) of the host. The transaction 800 also includes the storage system ID data field 810 used to identify the storage system that generated the blockchain transaction. The transaction also includes the license key data field 815 used to identify the license key was assigned to the host, and a date and time data field 820 used to identify when the license key was assigned to the host 820. Optionally, the transaction may contain additional information data fields, such as a software version data field 825 used to identify the version of the software associated with the license key, and an OS data field 830 used to identify the version of the host operating system (OS). This optional additional information enables the blockchain to keep track of which license keys are in use on particular versions of the software and to be used to determine the operating environments in which the software versions are being used.

Figure 9:
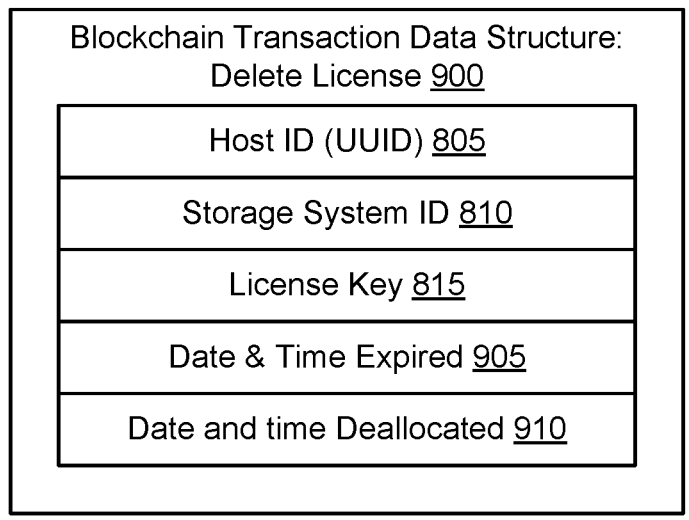
FIG. 9 is a functional block diagram of an example blockchain transaction data structure associated with deleting allocation of a software license key to a host, according to some embodiments.

FIG. 9 is a functional block diagram of an example blockchain transaction data structure having a plurality of data fields 805-815, and 905-910 configured to enable description of a transaction associated with deleting allocating a software license key to a host, according to some embodiments.

In some embodiments, as shown in FIG. 9, a delete license transaction data structure 900 includes the same host ID data field 805, array ID data field 810, and license key data field 815 as are contained in the add license transaction data structure 800. Additionally, the delete license transaction 900 includes a data field used to identify the date and time that the license expired 925 or a data field used to identify the date and time the license was deallocated 930. The delete license transaction may include other additional information fields depending on the implementation.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing layered-infrastructure blockchain-based system for software license distribution, comprising:
    maintaining a distributed cloud of blockchain full nodes, each blockchain full node containing a blockchain full node data structure recording a complete set of license key transactions by a plurality of hosts on a plurality of storage systems;
    maintaining a respective blockchain light data structure on each of the plurality of storage systems, each respective blockchain light data structure recording a subset of the license key transactions by hosts on the respective storage system;
    receiving a license key by a first of the storage systems from a first host, in connection with the first host seeking to access the first storage system;
    generating a first license key transaction by the first storage system;
    transmitting the first license key transaction by the first storage system to the distributed cloud of blockchain full nodes;
    verifying the first license key transaction by the distributed cloud of blockchain full nodes;
    generating a first blockchain light data structure update for the blockchain light data structure of the first storage system, the first blockchain light data structure update containing the first license key transaction; and
    using the first blockchain light data structure update to update the blockchain light data structure of the first storage system;
    wherein the license key transactions are associated with connection events between the plurality of hosts and the plurality of storage systems.

2. The method of claim 1, further comprising:
    communicating the first license key from the first storage system to a subset of the other storage systems of the plurality of storage systems;
    using the license key by each storage system of the subset of other storage systems to determine if the license key is contained in the respective blockchain light data structure of any storage system of the subset of other storage systems.

3. The method of claim 1, further comprising granting access by the first storage system to the first host prior to transmitting the first license key transaction by the first storage system to the distributed cloud of blockchain full nodes.

4. The method of claim 3, further comprising:
    determining that the first license key is not valid;
    issuing a second license key by the first storage system to the first host;
    generating a second license key transaction associated with the second license key by the first storage system; and
    transmitting the second license key transaction by the first storage system to the distributed cloud of blockchain full nodes.

5. The method of claim 1, wherein the first license key transaction is implemented using an add license blockchain transaction data structure having a plurality of data fields configured to identify the first host, first storage system, first license key, and a date and time the first license key was received by the first storage system from the first host.

6. A layered-infrastructure blockchain-based system for software license distribution, comprising;
    a distributed cloud of blockchain full nodes, each blockchain full node containing a blockchain data structure on which a complete set of license key transactions are recorded;
    a plurality of storage systems, each respective storage system containing a blockchain light data structure on which only a subset of license key transactions associated with the respective storage system are recorded; and
    a plurality of host computers connected to the plurality of storage systems;
    wherein the license key transactions are associated with connection events between the plurality of host computers and the plurality of storage systems; and
        wherein a first storage system receives a license key from a first host computer, in connection with the first host computer seeking to access the first storage system;
        the first storage system generates a first license key transaction;
        the first storage system transmits the first license key transaction to the distributed cloud of blockchain full nodes;
        the distributed cloud of blockchain full nodes verifies the first license key transaction;
        the distributed cloud of blockchain full nodes generates a first blockchain light data structure update for the blockchain light data structure of the first storage system, the first blockchain light data structure update containing the first license key transaction; and
        the first storage system uses the first blockchain light data structure update to update the blockchain light data structure of the first storage system.

7. The layered-infrastructure blockchain-based system of claim 6, wherein the license key transactions comprise add license key blockchain data structures and delete license key blockchain data structures.

8. The layered-infrastructure blockchain-based system of claim 7, wherein each add license key blockchain data structure has a respective plurality of data fields containing information identifying a respective host computer, a respective storage system, a respective license key, and a respective date and time the respective license key was received by the respective storage system from the respective host computer.

9. The layered-infrastructure blockchain-based system of claim 7, wherein each delete license key blockchain data structure has a respective plurality of data fields containing information identifying a respective host computer, a respective storage system, a respective license key, and a respective date and time the respective license key was deleted by the respective storage system.

10. The layered-infrastructure blockchain-based system of claim 6, wherein at least a subset of the plurality of storage systems are interconnected and configured to process license key transactions received from other storage systems against their respective blockchain light data structures.

11. The layered-infrastructure blockchain-based system of claim 6, wherein the distributed cloud of blockchain full nodes is configured to generate blockchain light node updates for each of the plurality of storage systems, each blockchain light node update containing license key transactions related to the host computers connected to the respective storage system.

\* \* \* \* \*